No. 780,170. PATENTED JAN. 17, 1905.
F. O. HARDY.
VEHICLE END GATE FASTENER.
APPLICATION FILED APR. 25, 1904.
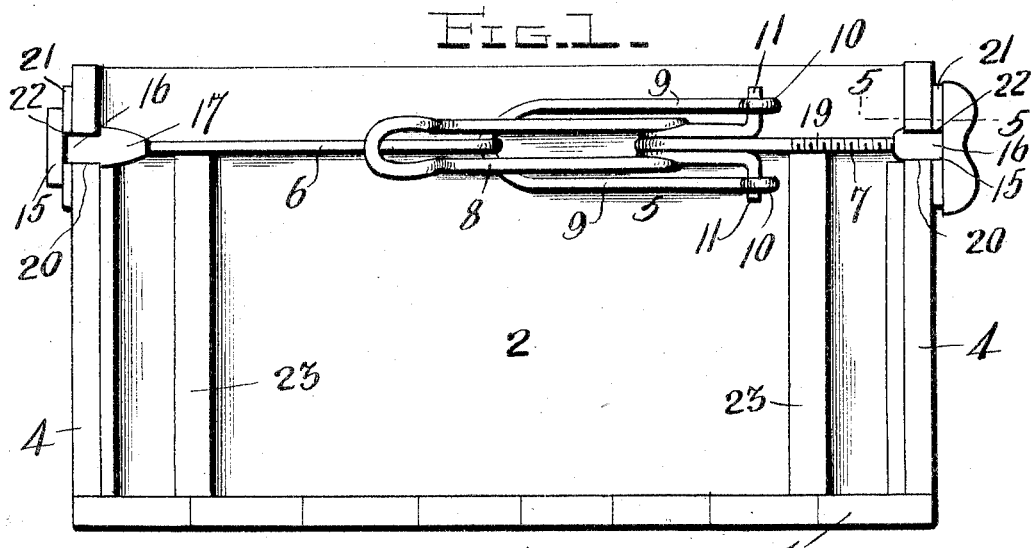
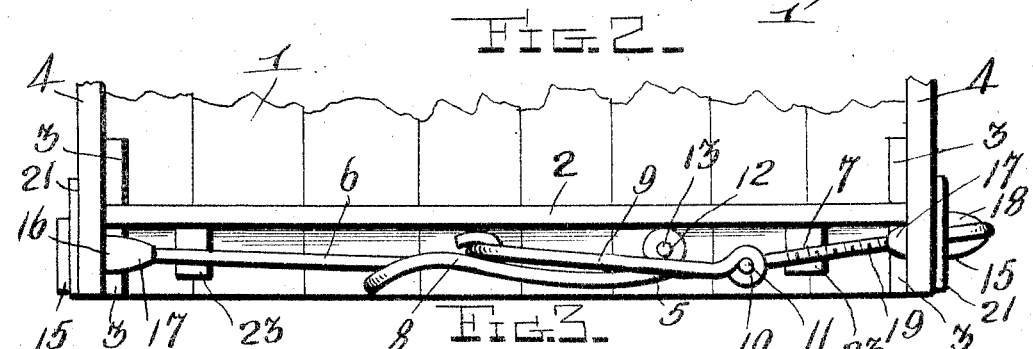
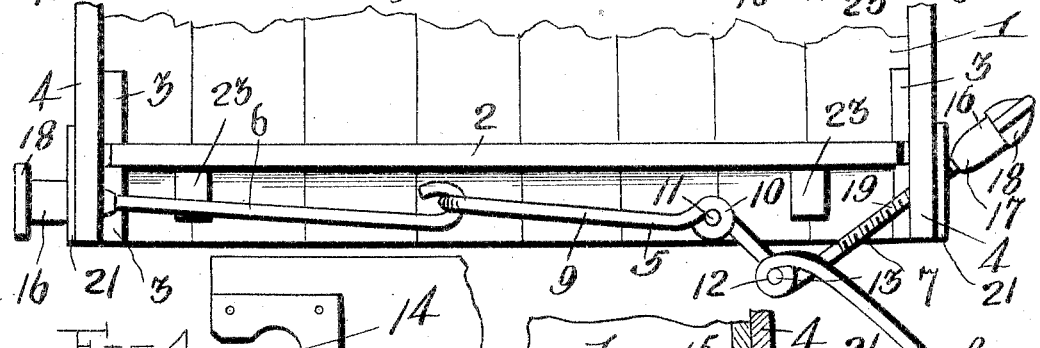
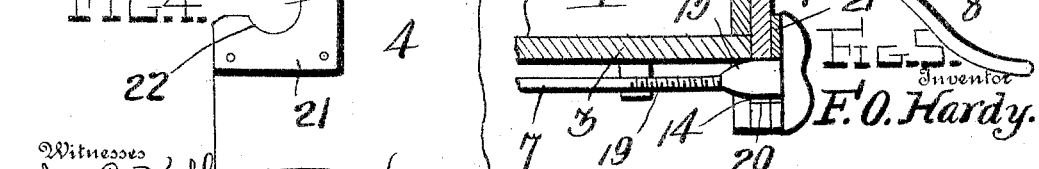
Inventor
F. O. Hardy.
Witnesses
By H. R. Wilson
Attorney No. 780,170. Patented January 17, 1905.

UNITED STATES PATENT OFFICE.

FRED O. HARDY, OF HULL, ILLINOIS.

VEHICLE-END-GATE FASTENER.

SPECIFICATION forming part of Letters Patent No. 780,170, dated January 17, 1905.

Application filed April 25, 1904. Serial No. 204,822.

*To all whom it may concern:*

Be it known that I, FRED O. HARDY, a citizen of the United States, residing at Hull, in the county of Pike and State of Illinois, have invented certain new and useful Improvements in Vehicle-End-Gate Fasteners; and I do declare the following to be a full, clear, and exact description of the invention, such as will enable others skilled in the art to which it appertains to make and use the same.

My invention relates to a fastening device particularly designed for securing end-gates in the bodies of wagons or other vehicles, but which may be used for other purposes.

The object of my invention is to provide a simple, durable, and comparatively inexpensive device of this character which will hold the end-gate of a vehicle firmly and securely in place and which may be easily and quickly operated to fasten or unfasten the end-gate.

With these and other objects in view the invention consists of certain novel features of construction, combination, and arrangement of parts, as will be more fully described, and particularly pointed out in the appended claims.

In the accompanying drawings, Figure 1 is an end elevation of a vehicle-body with my improved end-gate fastener applied thereto. Fig. 2 is a top plan view of the same, my fastener being in its closed position. Fig. 3 is a view similar to Fig. 2 with my fastener in its opened position. Fig. 4 is a detail view of a portion of one of the sides of the vehicle-body. Fig. 5 is a detail horizontal sectional view taken on the line 5 5 in Fig. 1.

Referring to the drawings by numerals, 1 denotes a portion of the rear end of the body of a wagon or other vehicle, and 2 denotes the usual end-gate, which is mounted to slide between cleats 3, secured upon the inner faces of the sides 4 of the body, as is common in devices of this character.

My improved fastener 5, which is in the form of a clamp connecting the sides 4 in rear of the end-gate, comprises two clamping rods or members 6 and 7 and an operating-lever 8, to which the inner ends of each of said rods is pivotally secured. The inner end of said rod 6 is forked or bifurcated to form parallel arms 9, having at their ends bearing-apertures 10, into which project trunnions or pivots 11, provided upon one end of the lever 8 in order to effect a pivotal connection between said rod and lever. Said lever is U-shaped and curved, as shown, the trunnions or pivots 11 being formed by bending the ends of its arms outwardly at right angles. Formed in said arms of the lever adjacent to said trunnions or pivots 11 are bearing-openings 12, into which project trunnions or pivots 13, provided upon the inner end of the rod 7 in order to effect a pivotal connection between said rod 7 and the lever.

The rods 6 and 7 project through openings 14, formed in the ends of the sides 4 of the body, and have upon their outer ends or extremities clamping-heads 15, each of which comprises a cylindrical body portion 16 of greater diameter than the rods 6 and 7, a tapered or cone-shaped portion 17 at the inner end of said body portion, and an enlarged cap 18 upon the outer end of said body portion. The head 15 upon the rod 6 is rigidly secured, while that upon the rod 7 is adjustably mounted, preferably by forming said head with a screw-threaded opening through which the similarly-screw-threaded outer end 19 of the rod 7 projects. The head 15 on the rod 7 is thus in the form of a nut, and in order to facilitate turning the same its cap 18 is formed with wings, as shown. The said openings 14, which are circular and of slightly greater diameter than the body portions 16 of the heads 15, have communicating with them narrow slots 20, which open at the rear ends of the sides 4 of the wagon-body 1, as shown, and through which the rods 6 and 7 are adapted to be passed in inserting and removing them from the said openings 14. After said rods have been thus inserted in the said openings and have been moved longitudinally to cause their heads 15 to engage said openings their displacement will be prevented by reason of the diameters of the body portions 16 of the heads being greater than the width of said slots 20. It will be seen upon reference to Fig. 5 of the drawings that when said heads engage said openings the body portion 16 enters said openings 13, the tapered portions 17 engage the end of the outer face of the end-gate 2 to force it against the inner cleats 3, and the caps 18 bear against metal wear-plates 21, which are screwed upon the outer faces of the ends 4 and have openings 22 corresponding to and registering with said openings 13 and said slots 20, as shown in Fig. 4. While the tapered portions of the heads hold the end-gate firmly in position, its removal is more effectively prevented by the provision of cleats or blocks 23, secured upon the outer face of the end-gate below the fastener. It will be seen that the upper ends of said cleats or blocks 23 engage the rods 6 and 7, which rods prevent the removal of the end-gate until the fastener is first removed.

The operation of the device will be readily seen upon reference to the drawings. When the fastener 5 is removed, the end-gate 2 slides freely between the sides 4 in the guides formed by the cleats 3, and when the end-gate is in position and it is desired to secure the same the fastener is applied by inserting the rods 6 and 7 through the slots 20 into the openings 14. The fastener or clamp is then closed by swinging the lever 8 from the position shown in Fig. 3 to that shown in Fig. 2, the attachment of the rods to said lever being such that when said lever is thus operated the rods will be drawn together to cause their heads 15 to enter the said openings 14. Owing to the construction and shape of the lever and also of the rods, the pivot of the rod 7 will be permitted to pass over or beyond the center of the pivot of the rod 6, and thus lock parts of the fastener in this position, as will be readily understood. The heads 15 as they are drawn into the openings 14 will effectively clamp the sides 4 of the wagon-body upon the ends of the end-gate, and this clamping action may be varied as desired by moving the adjustable head 15 longitudinally upon the rods 7. It will be seen that the end-gate is thus held firmly and securely in position by both the clamping action of the heads 15 and the engagement of the cleats or blocks 23 with the rods 6 and 7.

From the foregoing description, taken in connection with the accompanying drawings, the construction and operation of the invention will be readily understood without requiring a more extended explanation.

Having thus described my invention, what I claim as new, and desire to secure by Letters Patent, is—

1. In combination with a vehicle-body having its sides provided with vertical guide devices, openings and contracted slots leading from the openings to one end of each of the sides, an end-gate engaged by the guide devices, clamping-rods provided at their outer ends with heads, of greater diameter than the rods, to engage the openings in the sides of the vehicle-body and having enlargements at their outer portions to bear against the outer surfaces of the sides, said heads serving to lock said clamping-rods from lateral movement and disengagement from the said openings by such movement, the diameter of the said clamping-rods being such as to enable them to be detached from the sides of the vehicle-body by drawing them laterally through the slots therein, and a clamping-lever connected to the inner ends of said rods and adapted to draw them together and to move them outwardly to disengage their heads from said openings, said clamping rods and lever being disconnected from the gate and detachable from the sides of the body independently of the gate.

2. In combination with a vehicle-body having its sides provided with vertical guide devices, openings and contracted slots leading from the openings to one end of each of the sides, an end-gate engaged by the said guide devices and vertically removable from the sides, said end-gate having projections on its outer side, clamping-rods provided at their outer ends with heads, of greater diameter than the rods, to engage the openings in the sides of the vehicle-body and having enlargements at their outer portions to bear against the outer surfaces of the sides, said heads serving to lock said clamping-rods from lateral movement and disengagement from the said openings by such movement, the diameter of the said clamping-rods being such as to enable them to be detached from the sides of the vehicle-body by drawing them laterally through the slots therein, and a clamping-lever connected to the inner ends of said rods and adapted to draw them together and to move them outwardly to disengage their heads from said openings, said clamping rods and lever being disconnected from the gate and detachable from the sides of the body independently of the gate and bearing on the projections with which the gate is provided, substantially as described.

In testimony whereof I have hereunto set my hand in presence of two subscribing witnesses.

FRED O. HARDY.

Witnesses:
A. L. MAPLE,
J. T. MURRAY.